March 27, 1945. V. J. BURNELLI 2,372,250
COMBINED ENGINE COOLING AND JET PROPULSION MEANS
Filed June 27, 1941

INVENTOR
Vincent J. Burnelli
BY
Frederick W. Barker
ATTORNEY

Patented Mar. 27, 1945

2,372,250

UNITED STATES PATENT OFFICE 2,372,250

COMBINED ENGINE COOLING AND JET PROPULSION MEANS

Vincent J. Burnelli, Matawan, N. J., assignor to V. J. Burnelli Airplanes Inc., Red Bank, N. J., a corporation of New Jersey Application June 27, 1941, Serial No. 400,036

1 Claim. (Cl. 244—15)

This invention relates to novel means for controlling the air employed in cooling air cooled engines on airplanes and for combining it with the exhaust gases as jet propulsion means.

In brief my improvement consists in the provision of an insulated duct through a wing in whose leading edge an engine is mounted. Air entered through the engine cowling streams over and around the engine cylinders and becomes heated and thus expanded by reason of the fact that the engine exhaust manifold and pipe are contained within the duct. Turbosupercharger means are located in the duct, driven by the engine exhaust, and supply air to the carburetor by means of a pipe in which latter is included an intercooler to lower the temperature of the air in its passage.

The exhaust gases which leave the supercharger mingle with the expanded air in transit through the duct and this combined fluid mixture issues with force from a duct exit located at the trailing edge of the wing. Since the air enters the engine cowling at high speed and is greatly expanded by exhaust heat in its passage through the duct, whose cross sectional area reduces toward its exit, it follows that the mixture of air and exhaust gases will issue with sufficient force to have the effect of jet propulsion, thus adding to the propeller power for flight purposes.

The exit for the mingled air and exhaust gases may be controlled by shutters or other suitable means for regulating the outward flow.

An oil cooler is also included in the duct to be subject to the cooling influence of the passing air therein. Thus, all heat dissipating means are located in the duct.

The theory underlying my present improvement comprises the use of a duct through a wing to provide cooling for an air cooled engine and its heat dissipating appurtenances. This involves an air flow control based on suitable inlet area at the cowling front with reduced velocity through the duct for cooling the appurtenances, thereby taking advantage of the expansion of the air in the enlarged duct portion and the acceleration of air flow at the rear exit, whereby the exit velocity exceeds the entry speed, and thus recovering, through jet propulsion effect, a certain amount of the power loss in cooling.

While adapted for use in any airplane wing capable of carrying an engine at its leading edge, obviously this device is particularly suitable for service with the Burnelli type of lifting fuselage airplane, as disclosed in patents Nos. 1,758,498 and 1,998,487, because such type, with its large central wing section, is best provided with the space to accommodate the duct which contains the necessary equipment.

Other features and advantages of my invention will hereinafter appear.

Figure 1:
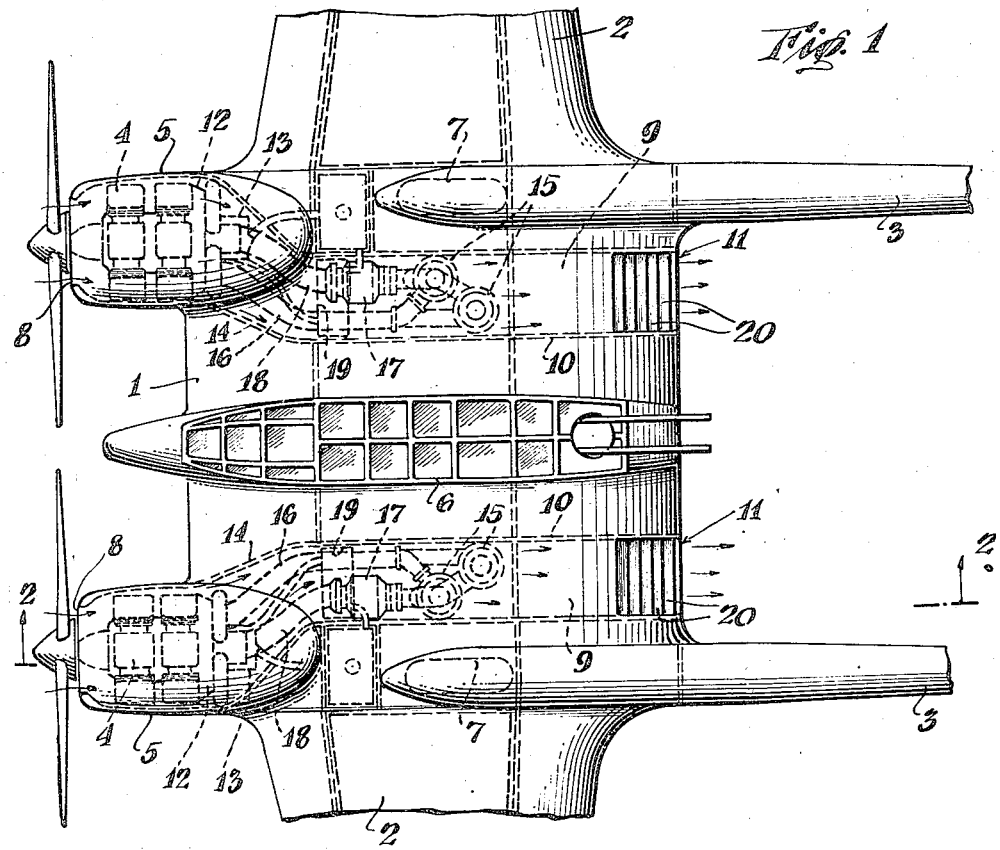
Figure 1 is a horizontal sectional view of an airplane, partly broken away.
Figure 2:
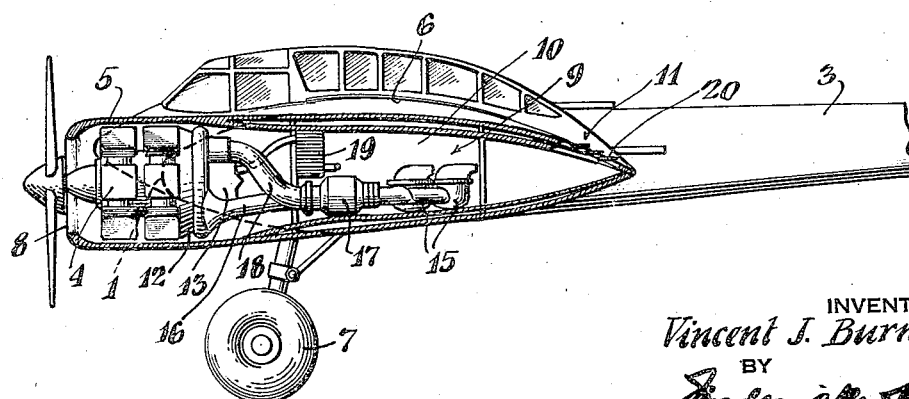
Fig. 2 is a side sectional view taken on the line 2—2 of Figure 1.

In said figures let 1 indicate the central wing section of a Burnelli type, all-wing airplane, having the lateral wing portions 2, broken away, tail carrying booms 3, also broken away, engines 4 and cowlings 5.

A longitudinally central portion 6 of wing 1 is shown as providing for pilot and crew accommodation, and, at the opposite sides of wing 1 are compartments to receive the landing gear wheels 7 when they are retracted.

Thus far the elements referred to are usual in the Burnelli type airplane.

In carrying out my invention provision is made as by inlet 8 for the entry of air at the cowling front, so that cooling air may pass at high speed over and around the cylinders, thereby effecting heat exchange, the then heated air passing into and through a duct 9, whose wall is provided with heat insulating material 10, and out at a rear exit 11.

The duct 9, at its front end, embraces the rear end of the engine, including the exhaust manifold 12 and carburetor 13, and said duct is here shown as offset, at 14, to avoid the wheel retraction compartment, the reason for this arrangement being that the engine and retraction compartment are in substantial alignment and hence the duct 9, which is extended throughout the chord of the wing, has to be offset in the manner indicated when employed in the central wing section of a Burnelli type airplane, as disclosed in Patents 1,758,498 and 1,998,487.

Because of the limited area within the duct 9 I have shown two turbo-superchargers 15 to supply air to the carburetor 13, these turbo-superchargers being driven by the exhaust gases that flow thereto from exhaust pipe 16, these gases thence passing rearwardly to the duct exit.

Air collected by the turbo-superchargers is directed into an intercooler 17 where its temperature is lowered before passing, by means of a pipe 18, to the carburetor.

Located in the oil feed line, within duct 9, is an oil cooler 19 that is subject to the stream of air flowing through the duct.

There are thus several heat dissipating units contained in duct 9, resulting in the very considerable expansion of the air which has performed cooling operations for the engine cylinders, the intercooler and the oil cooler, and, mingling with the exhaust gases, issues therewith in a powerful stream from exit 11 to supplement the propeller energy.

Control means for exit 11, such as the shutter arrangement indicated at 20 may be employed to regulate the outward flow of the mingled air and exhaust gases.

Variations within the spirit and scope of my invention are equally comprehended by the following claim.

I claim:

In an airplane, a wing, a lifting fuselage disposed centrally thereof and forming a part of said wing, a crew compartment located centrally in said lifting fuselage, air cooled engines mounted at the leading edge of said lifting fuselage, at opposite sides of said crew compartment, a cowling for each engine having an inlet adapted for the heat exchange flow of air over the engine cylinders, ducts disposed wholly within and extended substantially entirely through the chord of said lifting fuselage, retractile landing wheel compartments located in the lifting fuselage in line with the engines respectively, each duct communicating at one end with an engine and embracing within the confines thereof the rear end of the engine, said ducts being offset from their respective engines to parallel said wheel compartments, engine exhaust means in each duct to expand the volume of the entered air and heat dissipating engine appurtenances in said duct, said exhaust means opening into the duct to enable the exhaust gases to mingle with and add pressure to the fluid flow and each duct having exit means of reduced capacity to accelerate the fluid flow therefrom.

VINCENT J. BURNELLI.